Dec. 6, 1966  HO CHOW  3,290,072
SWIVEL JOINTS
Filed May 6, 1963
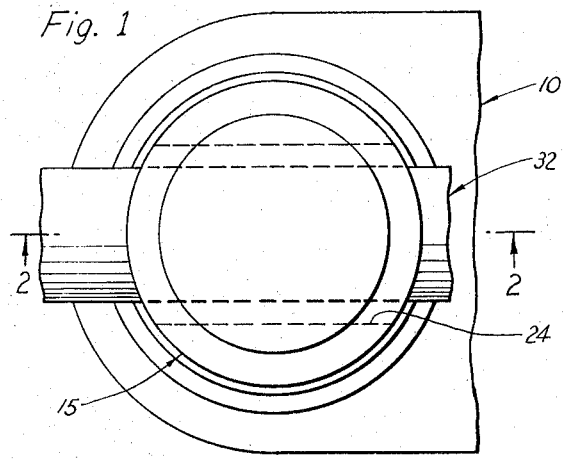
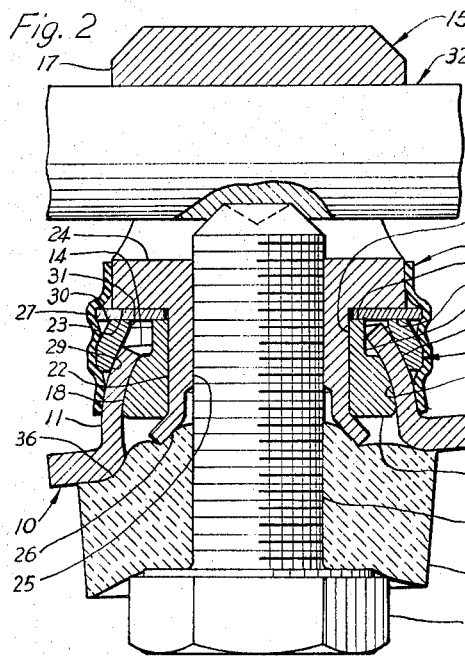 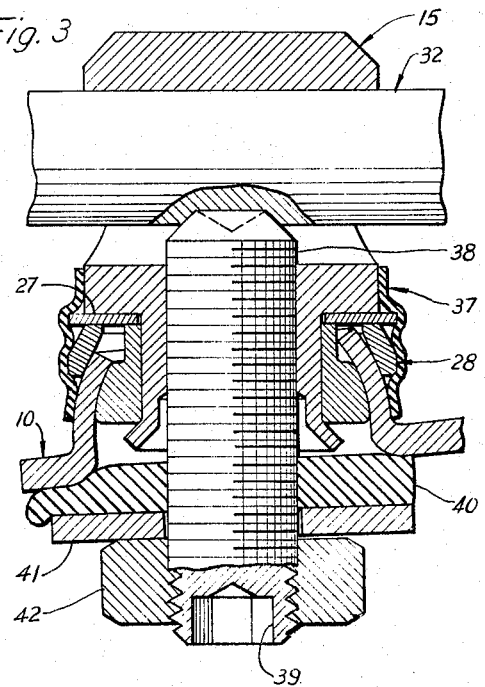
INVENTOR.
HO CHOW

United States Patent Office 3,290,072
Patented Dec. 6, 1966

3,290,072
SWIVEL JOINTS
Ho Chow, 115 Bennett Ave., Yonkers, N.Y.
Filed May 6, 1963, Ser. No. 278,003
8 Claims. (Cl. 287—87)

This application constitutes a continuation-in-part of the prior application filed jointly by me and Louis Josephson, Serial No. 264,954 filed March 13, 1963.

This invention relates to an improved swivel joint and one of its objects is to provide a limited tilting movement and complete rotative movement between a ball member and a stud member which has an adjustable means of receiving and retaining a bar element and further wherein seal or vibration dampering means is employed.

According to this invention, a swivel joint consists of a ball member having a hollow ball which has inside and outside bearing surfaces and an end hole, a stud member passing loosely through the end hole and having a bushing and a shank, the bushing having a surface in bearing contact with the inside surface of the hollow ball, a retainer interposed between the hollow ball and the stud member, said retainer having a surface in bearing contact with the outside surface of the hollow ball and a flat surface in bearing contact with part of the shank of the stud member to provide with a free floating movement of the retainer along its flat surface, and means of adjustably securing a bar element to the stud member, while premitting a limited tilting movement and a complete rotative movement between the ball and stud members.

Another object of this invention is the provision of a sleeve for the enclosing of the hollow ball and the retainer.

Another object of this invention is the provision of a cushion between the hollow ball and said bushing.

A still further object of this invention is the provision of a locking device to stop the relative movements between all members.

With the above and other objects in view the invention comprises certain new and useful constructions, combinations and arrangements of parts, clearly described in the following specification and fully illustrated in the drawing, in which:

FIG. 1 is a plain view of a swivel joint according to this invention.

FIG. 2 is a partial cross-sectional view thereof, taken on the line 2—2 of FIG. 1, looking in the direction of arrows, and FIG. 3 is a view of another embodiment of the swivel joint according to this invention.

In the drawings, FIGS. 1 and 2 show a swivel joint constructed with a ball member 10 having a hollow ball 11. The hollow ball is formed to provide an internal segmental spherical bearing surface 12, an external segmental spherical bearing surface 13 and an end hole 14. Surfaces 12 and 13 have their centers as close as possible.

A stud member 15 consists of a bushing 16 and a shank 17. The bushing has a surface 18 in contact with the bearing surface 12 of the hollow ball 11, a sleeve portion 19 which passes loosely through the end hole 14, an end surface 20 and a hole 21. The shank 17 has a tubular portion 22, which fits in the hole 21 of the bushing, a flat surface 23 and a transverse opening 24. The tubular portion 22 has an internal thread 25 and a rivet portion 26. A washer 27 is provided between surfaces 20 and 23, when the flat surface 23 is not large enough or is a poor material for serving as a bearing. This washer creates a bearing surface 23'. By staking the rivet portion 26, the flat surface 23 or the bearing surface 23' is engaged with the end surface 20 of the bushing 16.

A retainer 28 has an internal surface 29 in bearing contact with the external bearing surface 13 of the hollow ball 11 and a flat surface 30 in bearing contact with the bearing surface 23' of the washer 27. The retainer also has an aperture 31 which will not touch the sleeve portion 19 of the bushing 16. The internal suface 29 could be in a conical shape as shown.

In order to secure the stud member 15 to a bar element 32, a set screw 33 having any means for turning is engaged with the internal thread 25 of the shank 17. This construction provides an adjustment of the stud member on the bar element. This set screw can be provided at the other end of the shank 17 for adjustably securing the bar element to the shank.

In order to prevent any foreign matters to get into the bearing surfaces or to preload the bearing surfaces for preventing any vibration noise, a cushion member 34 made from any elastic material, preferable of foam or sponge material, is attached to the stud member 15 on the set screw 33 and is compressed between a head 35 of the set screw 33 and the rivet portion 26 of the shank 17. This cushion member 34 has a surface 36 which maintains contact with the ball member 10 and allows the free movements between the ball and the stud members.

A sleeve 37 of any elastic material is also provided for the purposes of a complete sealing of bearing surfaces and preventing any vibration noise. This sleeve is in a hollow cylindrical shape as preferred before assembling. The center portion of the sleeve 37 is stretched and wrapped over the retainer 28 and the washer 27. One end of the sleeve 37 is stretched to tensionally engage the external bearing surface 13 of the hollow ball 11 and the other end, to tensionally engage the shank 17. This sleeve will allow for free movements of the ball member, the stud member and the retainer.

In this construction, the stud member 15 can tilt through a limited range and rotate through a complete circle or any part of it on the ball member 10 and the retainer 28 has a free floating movement on the bearing surface 23'.

In FIG. 3, another embodiment of this invention is shown. This structure is identical to that of FIG. 2 as designated with 10 for the ball member, 15 for the stud member, 27 for the washer, 28 for the retainer, 32 for the bar element and 37 for the sleeve. Instead of the screw 33 I provide a set screw 38 having any means for turning, such as a hexagon socket 39. The screw 38 engages the internal thread 25 of the shank 17 and has the same function as that of 33 to provide an adjustment of the stud member 15 on the bar element 32.

For the purposes of stopping the relative movement between the ball and stud members and preventing any foreign matters to get into the bearing surfaces, an elastic disc 40 and a washer 41 are placed over the set screw 38. A nut 42 is threadably engaged with the set screw 38 and tightened to press the washer 41 and the elastic disc 40 against the ball member 10. This elastic disc 40 will accommodate the tilt between the ball and stud members.

In this construction, the stud member, the ball member and the retainer can move relatively as in FIG. 2 and can be locked to prevent any relative movements by tightening the nut 42.

It will be understood, of course, that various details of construction may be varied through a wide range without departing from the principles of this invention and it is, therefore, not the purpose to limit patent granted hereon otherwise than necessitated by the scope of the appended claims.

Having fully described my invention, what I claim as new and desire to secure by Letters Patent is:

1. A swivel joint comprising a stud member having a tubular body portion with a cylindrical outer surface, a flange having a flat surface, a rivet-like expanded bottom flange portion, and a transverse opening in its top portion;
a shaft secured within the body portion, and a head attached to the end of the shaft; said shaft protruding perpendicularly into the transverse opening in the stud member;
a tubular bushing having a round inner surface and a curved outer bearing surface, the bushing surrounding the tubular portion of the stud member, said rivet-like flange portion extending radially outward beneath said bushing, said bushing thereby being held in position by the rivet-like portion;
a ball member having an internal segmental spherical concave bearing surface and an external segmental spherical convex bearing surface, the said inner surface being in bearing relationship with the curved outer bearing surface of the bushing, and having an end hole through which the shaft and stud tubular portion protrude; and
a ring-like retainer having an internal bearing surface in bearing contact with the external surface of the ball and a top flat surface in operative bearing contact with the flange of the stud; said retainer having a free floating movement along said flat surface.

2. A combination in claim 1, further comprising an elastic tubular cushioning member surrounding a portion of the shaft and compressed between the head and the ball member.

3. A swivel joint as set forth in claim 2, wherein a washer is disposed between the flange on the stud member and said retainer.

4. A swivel joint as set forth in claim 2, wherein an elastic sleeve engages and encloses said retainer, one end of said elastic sleeve engaging the external bearing surface of said ball and the other end of said elastic sleeve engaging the said stud member.

5. A swivel joint as set forth in claim 2, wherein a bar element is adjustably secured to said stud member by means of the transverse opening in said stud, and the shaft is a set screw which is advanced in a threaded opening in said stud to secure said bar element in said transverse opening.

6. A swivel joint as set forth in claim 2, wherein the shaft is a threaded screw.

7. A swivel joint as set forth in claim 2, wherein said inner bearing surface of the retainer is conical in form.

8. A swivel joint as set forth in claim 2, and also including locking means to lock relative movement between said ball and stud members.

References Cited by the Examiner

UNITED STATES PATENTS

| | | | |
|---|---|---|---|
| 473,665 | 4/1892 | Hendryx | 308—72 |
| 531,264 | 12/1894 | Kennedy | 287—21 |
| 931,692 | 8/1909 | Fyte | 248—181 |
| 1,171,738 | 2/1916 | Mallet | 306—7 |
| 2,145,958 | 2/1939 | Van Pelt | 287—21 X |
| 2,828,984 | 4/1958 | Chow. | |
| 2,974,352 | 3/1961 | Lockwood | 248—188.2 X |
| 3,011,811 | 12/1961 | Haller | 287—87 |

FOREIGN PATENTS 610,718　10/1948　Great Britain.

CARL W. TOMLIN, *Primary Examiner.*

THOMAS F. CALLAGHAN, *Examiner.*

A. V. KUNDRAT, *Assistant Examiner.*